United States Patent
Suzuki et al.

(10) Patent No.: US 9,172,282 B2
(45) Date of Patent: Oct. 27, 2015

(54) ELECTRIC MOTOR WITH ADD-ON UNIT, AS WELL AS A METHOD FOR CONNECTING AN ELECTRIC MOTOR AND AN ADD-ON UNIT

(75) Inventors: Tsuneo Suzuki, Mönchweiler (DE); Joachim Neumann, Buchenbach (DE); Wolfgang Stricker, Denzlingen (DE); Dominik Frey, Denzlingen (DE)

(73) Assignee: MAXON MOTOR AG, Sachseln (CH)

( * ) Notice: Subject to any disclaimer, the term of this patent is extended or adjusted under 35 U.S.C. 154(b) by 347 days.

(21) Appl. No.: 13/458,696

(22) Filed: Apr. 27, 2012

(65) Prior Publication Data
US 2012/0293025 A1    Nov. 22, 2012

(30) Foreign Application Priority Data
Apr. 28, 2011   (EP) .................................... 11003502

(51) Int. Cl.
| | | |
|---|---|---|
| H02K 7/00 | (2006.01) | |
| H02K 5/00 | (2006.01) | |
| F16B 4/00 | (2006.01) | |

(52) U.S. Cl.
CPC . H02K 5/00 (2013.01); *F16B 4/006* (2013.01); *Y10T 29/49865* (2015.01)

(58) Field of Classification Search
CPC ......... H02K 5/26; H02K 7/145; A47J 43/082; A47J 43/087
USPC ....................... 310/66, 75 D, 103; 403/28–30
See application file for complete search history.

(56) References Cited

U.S. PATENT DOCUMENTS

| | | | | |
|---|---|---|---|---|
| 3,945,476 | A * | 3/1976 | de Jong ........................ | 192/12 D |
| 4,763,031 | A * | 8/1988 | Wang .............................. | 310/83 |
| 4,862,335 | A   | 8/1989 | Vadseth | |
| 4,991,991 | A * | 2/1991 | Ito et al. .......................... | 403/30 |
| 5,373,391 | A * | 12/1994 | Isobe et al. ................. | 359/216.1 |

(Continued)

FOREIGN PATENT DOCUMENTS

| | | |
|---|---|---|
| DE | 88 03 570 U1 | 6/1988 |
| DE | 197 29 988 C1 | 8/1998 |
| DE | 19729988 C1 * | 8/1998 |

(Continued)

OTHER PUBLICATIONS

Machine translation of DE 19729988.*

(Continued)

*Primary Examiner* — Naishadh Desai
(74) *Attorney, Agent, or Firm* — Buchanan Ingersoll & Rooney PC

(57) ABSTRACT

An electric motor with an add-on unit, such as a gearbox unit, encoder unit or controller unit, and disclosed whereby the electric motor and add-on unit can be firmly connected to each other. For a firm connection, a shrink ring is thermally shrunk on to the electric motor and add-on unit in the area of the joint so that the shrink ring covers the joint. A method is also disclosed for producing the connection, wherein a temperature difference is first created between the shrink ring on the one hand and the electric motor as well as add-on unit on the other hand, whereby furthermore the temperature of the shrink ring is greater than the temperature of the electric motor and add-on unit and whereby the components are then joined together and held so that the shrink ring shrinks on to the electric motor and add-on unit.

20 Claims, 4 Drawing Sheets

(56) References Cited

U.S. PATENT DOCUMENTS

2008/0136277 A1 6/2008 Esders
2012/0091865 A1 4/2012 Knoedler et al.

FOREIGN PATENT DOCUMENTS

| DE | 10 2009 000169 A1 | 7/2010 |
| DE | 10 2009 032088 A1 | 1/2011 |
| FR | 2 658 284 A1 | 8/1991 |
| FR | 2658284 A * | 8/1991 |

OTHER PUBLICATIONS

Machine translation of FR 2658284.*
Search Report issued on Sep. 27, 2011, by European Patent Office for Application No. 11003502.

* cited by examiner

ELECTRIC MOTOR WITH ADD-ON UNIT, AS WELL AS A METHOD FOR CONNECTING AN ELECTRIC MOTOR AND AN ADD-ON UNIT

RELATED APPLICATION

This application claims priority under 35 U.S.C. §119 to European Patent Application No. EP 11003502.9 filed in Europe on Apr. 28, 2011, the entire content of which is hereby incorporated by reference in its entirety.

FIELD

The present invention relates to an electric motor with an add-on unit and to a method for connecting an electric motor and an add-on unit.

BACKGROUND INFORMATION

According to today's requirements, electric motors are often used with an add-on unit that is firmly connected to the electric motor. For example, in many cases it is necessary to equip the electric motor with a firmly connected gearbox unit in order to make it possible to provide the required torque while keeping a compact design. Often additional add-on units, such as encoder units or controller units, are also firmly connected to the electric motor. Together, the electric motor and the add-on unit form an assembly that itself represents a unit and that is manufactured, sold and also deployed as such.

A plurality of ways of connecting an electric motor and add-on unit are known from the state of the art. For example, it is common to screw, caulk or weld the housing of an add-on unit, for example, of a gearbox, to the electric motor. These types of connections are either expensive or lead to radial deformations of the connected components. Although it is true that there is no danger of deformation provided the electric motor and add-on unit are screwed together, this type of connection requires, however, a connection flange on both the electric motor and on the add-on unit, as a result of which the required construction volume is relatively large, particularly in the radial direction. The assembly proves to be extremely complex and is additionally very expensive particularly when the electric motor and add-on unit are screwed together. This is accounted for by the fact that the bore holes in the two flanges must be made with extreme precision and the screws that are used, as additional components, make the final product more expensive. Particularly in the case of small motors and micro motors, screwing the electric motor to an add-on unit often is ruled out due to the abovementioned reasons, particularly due to the increased construction volume.

Furthermore, bringing about a connection between the electric motor and the add-on unit by means of a snap-on connection is known from the state of the art. For example, a positive-locking connection between a gearbox housing part made of plastic and an adapter plate of an electric motor is known from DE 19729988 C1. There the ring gear of a planetary gear forms the gearbox housing part that is connected to the electric motor. The adapter plate that is connected to the electric motor can be slid into the ring gear in such a way that the cylindrical outer circumference of the adapter plate lies flatly on the inner circumference of the ring gear. The adapter plate furthermore comprises a plurality of latching lugs that are distributed along the circumference and that engage in corresponding latching openings of the ring gear. When the two components are inserted into each other, the ring gear, which is made of plastic, is expanded and does not return back into its undeformed state until the latching lugs have snapped into the latching openings.

The connection known from DE 19729988 C1 is therefore suitable only when one of the two components to be connected is produced from plastic and consequently has a lower level of stability than, for example, a metal component.

A further snap-on connection of an electric motor and add-on unit, said connection not being limited to the use of components made of plastic, is known from DE 102009032088 A1. Here a single-slotted radial elastic lock washer is used that sits both in a circumferential groove of an outer wall of the first component and also in a circumferential groove of an inner wall of the second component. The connection flanges of the electric motor and add-on unit must accordingly have different outer dimensions.

SUMMARY

The object of the present invention is to specify an alternative connection of an electric motor and add-on unit that allows economical and simple assembly and that additionally guarantees extremely stable cohesion between the electric motor and add-on unit. Additionally, it should be possible to keep the required construction volume of the assembly consisting of the electric motor and add-on unit low. Furthermore, the alternative connection should be possible both in the event that the electric motor and add-on unit have different dimensions and also in the event that these outer dimensions are the same. In particular, the connection should be suitable for the assembly of an add-on unit with a small motor or a micro motor.

Accordingly, a solution of the object according to the invention exists for an electric motor of the type mentioned at the beginning if, for a firm connection, a shrink ring is thermally shrunk on to the electric motor and add-on unit in the area of the joint so that the shrink ring covers the joint. The shrink ring encloses, so to speak, both a section of the electric motor and a section of the add-on unit placed on the electric motor. The solution according to the invention requires neither special processing nor the provision of connection flanges. The shrink ring, which is shrunk on from the outside, does not take up an especially great deal of construction space and it allows an economical and fast assembly of the components that are to be connected. The solution according to the invention is particularly suitable for small motors and micro motors that otherwise are caulked or welded to the add-on unit due to the often required miniaturization.

In a particularly preferred embodiment of the present invention, the shrink ring is shrunk onto the electric motor and the add-on unit in a friction locking. As a rule, this is accomplished because the shrink ring has a slightly smaller inner diameter before the assembly than the outer diameter of the electric motor and add-on unit in the area of the joint. The shrink ring is heated before the components are joined together, so that it expands and can be slid on to the electric motor and add-on unit. After the shrink ring has cooled, it is under stress at the covered areas of the electric motor and add-on unit, as a result of which the frictional connection is produced. Preferably both the shrink ring and the electric motor and add-on unit are executed in a cylindrical or hollow cylindrical manner in the area of the joint. Other shapes that differ from a cylindrical shape are also conceivable, however.

In a further embodiment of the present invention, equally wide areas of both the electric motor and add-on unit are covered or enclosed by the shrink ring. In this way, uniformly stable cohesion is guaranteed between the electric motor and the shrink ring and between the add-on unit and the shrink ring.

In a further embodiment of the present invention, the shrink ring is shrunk on to a housing part of the electric motor and to a housing part of the add-on unit, as a result of which no additional flanges are required on the electric motor or on the add-on unit.

In a further embodiment of the present invention, the shrink ring is shrunk on to a flange of the electric motor and to a ring gear of a gearbox unit. Here no additional connection component is required at least on the gearbox. The flange of the electric motor can correspondingly be selected according to the required gearbox.

In a further particularly preferred embodiment of the present invention, the electric motor and add-on unit are trimmed in a step-like manner circumferentially in the area of the joint, whereby the shrink ring is held in the stepped recesses. This offers the major advantage that the shrink ring can end on the outside at the outer contour of the electric motor and gearbox or add-on unit and does not protrude radially beyond the electric motor and add-on unit. As a result, the assembly consisting of the electric motor and add-on unit is constructed in an extremely narrow manner. Also, no disturbing edges and protrusions result that could impair both the usability and the aesthetics of the assembly consisting of the electric motor and add-on unit.

In a further preferred embodiment of the present invention, the inner side of the shrink ring and/or the areas of the electric motor and add-on unit covered by the shrink ring are roughened. As a result, the stability of the connection between the shrink ring and electric motor or add-on unit is improved due to increased static friction.

In a further particularly preferred embodiment of the present invention, the shrink ring and the areas of the electric motor and add-on unit covered by the shrink ring have positive-locking elements, whereby the positive-locking elements of the shrink ring and the positive-locking elements of the covered areas engage in one another. As a result, a positive locking can be produced in both the axial direction and the circumferential direction that likewise further increases the stability of the connection between the electric motor and add-on unit. Positive-locking elements can also be provided in order to guarantee the correct angular position during assembly, meaning while the shrink ring and the electric motor or add-on unit are being joined together. Alternatively, it is also possible to provide only markings on the shrink ring and electric motor or add-on unit, whereby these markings favour the joining process while maintaining the correct angular position.

Very particularly preferably, it can be provided that the electric motor and add-on unit each comprises a circumferential groove, into each of which a corresponding circumferential tongue of the shrink ring engages. This guarantees a positive locking in the axial direction which also allows trouble-free assembly without further ado.

In a further embodiment of the present invention, the electric motor and add-on unit have different diameters, at least in the area of the joint, whereby the shrink ring has a first section adapted to the diameter of the electric motor and a second section adapted to the diameter of the add-on unit. As a result, assembly of electric motors and add-on units with different diameters is also possible.

In a further particularly preferred embodiment of the present invention, the electric motor and add-on unit, at least in the area of the joint, consist of a material with a lower thermal expansion coefficient than the thermal expansion coefficient of the material of the shrink ring. As a result, a later disjoining of the connection between the electric motor and add-on unit is possible. Due to the lower thermal expansion coefficient, the electric motor and add-on unit do not expand to the same degree as the shrink ring itself when the shrink ring is reheated. At a correspondingly high temperature, the electric motor and add-on unit consequently can be pulled out of the shrink ring again. The electric motor and add-on unit preferably are made of steel, at least in the area of the joint, whereby the shrink ring is made of aluminium. In the case of this material configuration, good detachability of the connection between the electric motor and add-on unit has emerged when the shrink ring is reheated. As far as non-destructive re-detachability of the connection is not required, the shrink ring can also be made of steel. In this case, the shrink ring can be executed in an extremely thin manner and it will nevertheless satisfy the high requirements regarding the stability of the connection.

The invention furthermore provides a method for connecting an electric motor and an add-on unit. According to the invention, a shrink ring is thermally shrunk on in the area of the joint in order to connect the electric motor and add-on unit so that the shrink ring covers the joint, in that a temperature difference is first created between the shrink ring on the one hand and the electric motor as well as add-on unit on the other hand, whereby the temperature of the shrink ring is greater than the temperature of the electric motor and add-on unit. The components are then joined together and held, so that the shrink ring shrinks on to the electric motor and add-on unit.

In a preferred embodiment of the present invention, the inner dimension of the shrink ring that is to be shrunk on is slightly less at room temperature than the respective outer dimension of the areas of the electric motor and add-on unit that are covered by the shrink ring, whereby the temperature difference is dimensioned in such a way that the difference between the outer dimension of the areas covered by the shrink ring and the inner dimension of the shrink ring after the temperature difference has been produced is reduced at least to the point that the shrink ring can be slid on to the electric motor and add-on unit. Apart from that, it does not thereby play a role whether the shrink ring is slid on to the two components that are to be connected or the two components that are to be connected are slid into the shrink ring.

The temperature difference can be dimensioned in such a way that the inner dimension of the shrink ring is still smaller than the outer dimension of the electric motor and add-on unit. In this case, a correspondingly large joining press force must be applied. The energy required for this can, however, be less than the energy that would be required in order to produce a sufficiently large temperature difference between the components, so that there exists play between the shrink ring and the electric motor or add-on unit. The energy expenditure required for the assembly can be optimised in this way. It is also possible, however, to join the components together with a certain amount of play in the case of a corresponding temperature difference.

In a particularly preferred embodiment of the present invention, the temperature difference amounts to between 100 and 300° C. In the case of a temperature difference in this range, a particularly efficient assembly, particularly when steel shrink rings are used, has emerged. The temperature difference very particularly preferably amounts to 175° C.

In a further preferred embodiment of the present invention, the shrink ring is heated to achieve the temperature difference, whereby the electric motor and add-on unit remain at room temperature. As a result, only a heating device for the shrink ring is required, as a result of which the method can be kept particularly simple and economical. Alternatively, it is certainly very possible to cool the electric motor and add-on unit and simultaneously to heat the shrink ring.

The assembly process turns out to be extremely economical and simple if the shrink ring is heated by means of induction. This has turned out to be a simple and moreover particularly fast way of heating, particularly for shrink rings made of steel. Producing the connection between the electric motor and add-on unit can consequently be accomplished in an extremely swift manner. An induction coil that completely encloses the shrink ring is preferably provided for the heating. Heating by means of induction is not suitable, however, for shrink rings made of aluminium. Here heating by means of heat conduction suggests itself.

Preferred embodiments of the present invention are explained in more detail in the following on the basis of drawings.

BRIEF DESCRIPTION OF THE DRAWINGS

Shown are.

DETAILED DESCRIPTION

In the following explanations, the same parts are indicated with the same reference numbers.

Figure 1:
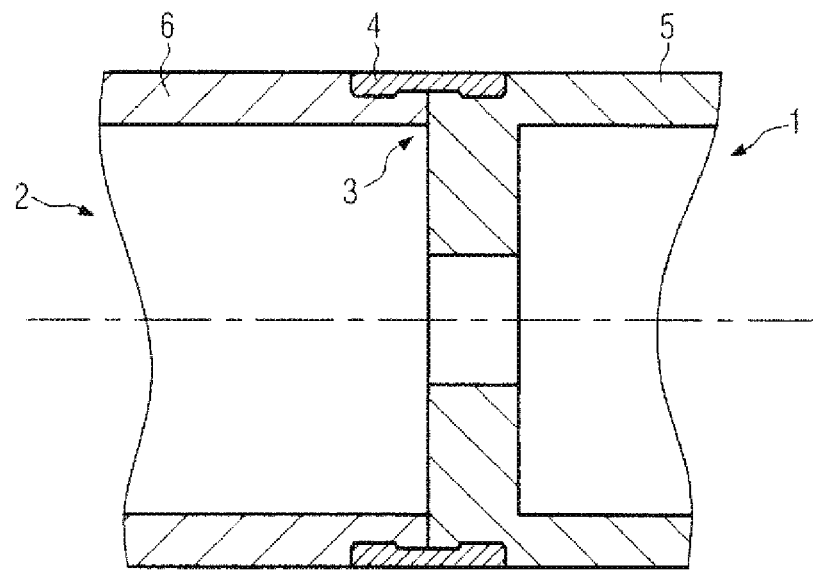
FIG. 1 a longitudinal section through an electric motor with add-on unit according to the invention.

FIG. 1 shows a longitudinal section through an electric motor 1 with connected add-on unit 2 according to the invention. The add-on unit can be either a gearbox or an encoder unit or a control unit. Only the housing 5 of the electric motor 1 is shown, whereby this housing is executed in an essentially hollow cylindrical manner. Also only the housing 6 of the add-on unit 2 is depicted. The housing 6 of the add-on unit is also formed in a hollow cylindrical manner, and it has the same outer diameter as the housing 5 of the electric motor.

A face side of the motor housing 5 and a face side of the housing 6 of the add-on unit meet at the joint 3. The face sides can fit against each other, but they do not have to. Housing 5 and housing 6 are connected to each other by means of the shrunk on shrink ring 4. The shrink ring 4 is shrunk on to the covered areas 10 of the electric motor and 11 of the add-on unit. Each of the areas 10 and 11 is formed by a circumferential strip of the outer contour of the electric motor housing and the housing of the add-on unit and they are trimmed in a step-like manner with respect to the actual outer diameter. The stepped recesses are identified with the reference numbers 7 and 8 in FIG. 2 and offer the advantage that the shrink ring 4 is completely countersunk into the housings 5 and 6. As a result, a uniform outer diameter follows for the assembly consisting of the electric motor 1 and add-on unit 2.

Figure 2:
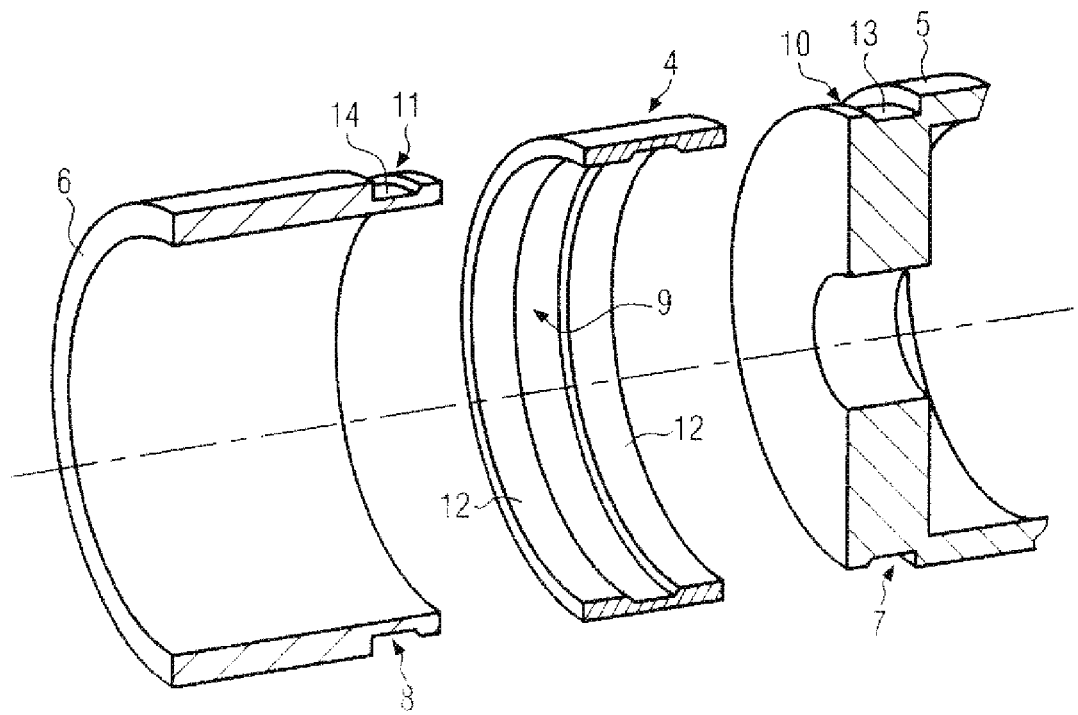
FIG. 2: an exploded drawing of the longitudinal section from FIG. 1 in a diagonal view.

As likewise can be seen in FIG. 2, a circumferential groove 13 is introduced in the area 10 of the electric motor housing covered by the shrink ring 4, whereby a corresponding tongue 12 of the shrink ring 4 engages in this groove 13. In this way, a secure positive locking is guaranteed in the axial direction between the electric motor housing 5 and the shrink ring 4. A corresponding groove 14 is also introduced in the area 11 of the housing 6 of the add-on unit covered by the shrink ring 4. A corresponding tongue 12 of the shrink ring 4 also engages in this groove 14. Each of the two tongues 12 of the shrink ring 4 is located on its inner side 9, whereby the tongue that engages in the groove 13 of the electric motor housing 5 is arranged on an axial end of the shrink ring and the second tongue that engages in the groove 14 of the housing 6 is arranged at the other axial end of the shrink ring. The two grooves 13 and 14 consequently form an undercut that prevents the shrink ring from sliding off after the shrinking process, even when acted on by a force.

Figure 4:
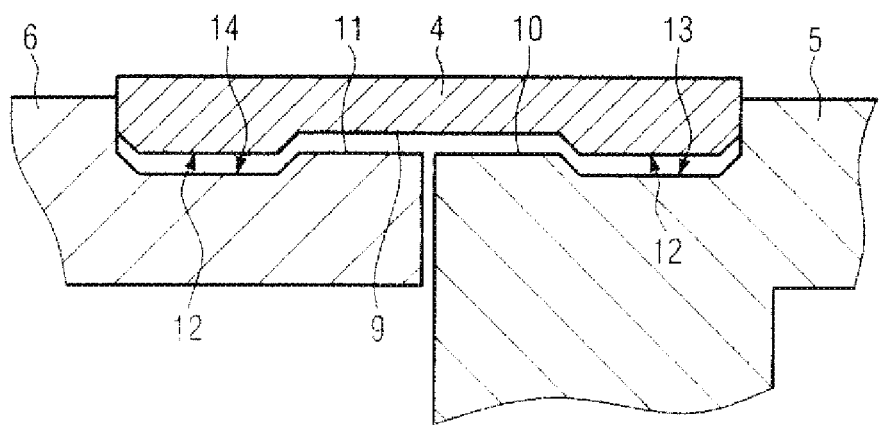
FIG. 4: a detailed view of the joint between the electric motor and add-on unit immediately after the shrink ring has been heated and the components have been joined together.
Figure 5:
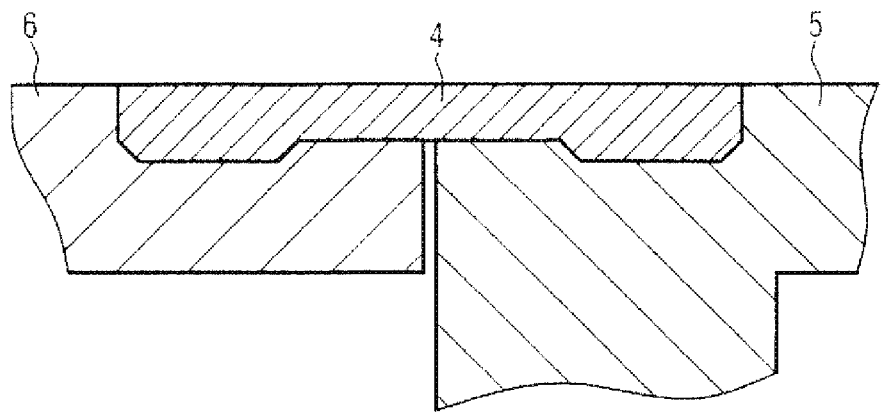
FIG. 5: the detailed view from FIG. 4 after the shrink ring has been cooled.

The method for producing the connection between the electric motor 1 and add-on unit 2 is explained in the following on the basis of FIGS. 3 to 5.

Figure 3:
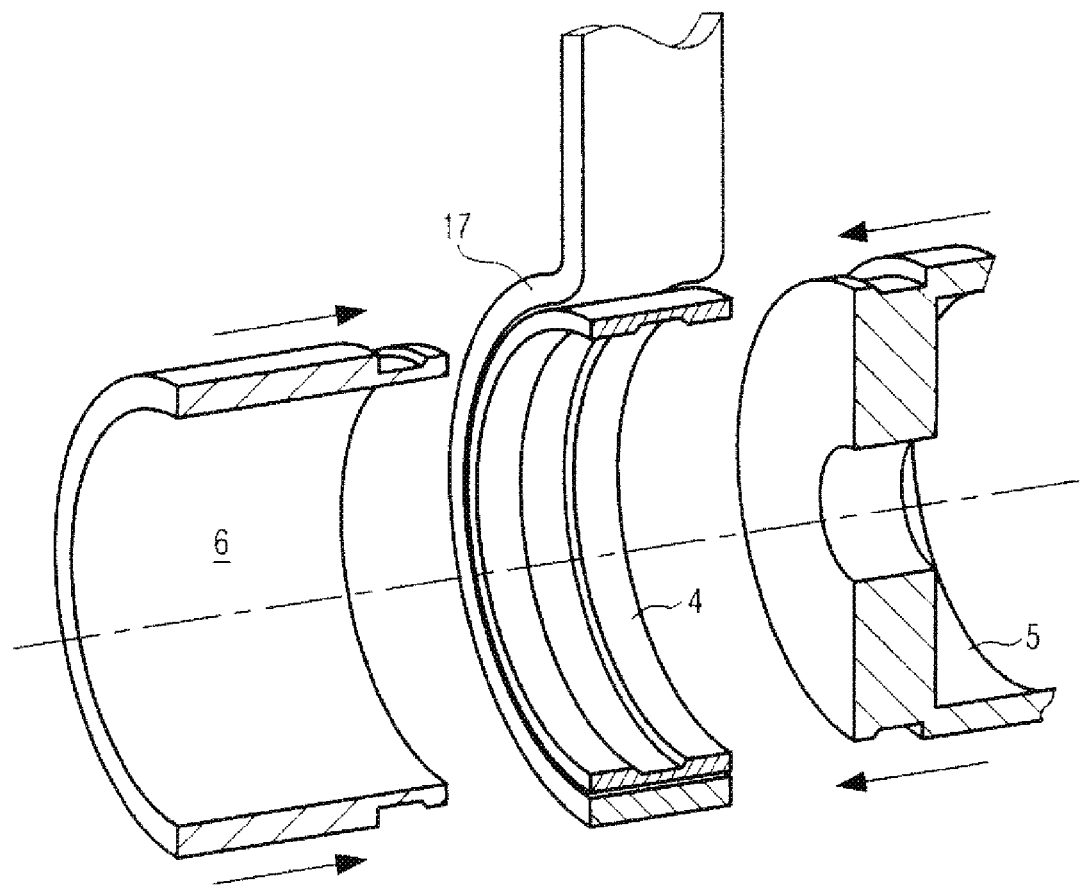
FIG. 3: a modified view of FIG. 2 for illustrating the method for connecting the electric motor and add-on unit.

The shrink ring 4 is first heated to roughly 200° C. by means of the induction coil 17 shown in FIG. 3, whereby this induction coil 17 completely encloses the shrink ring. The electric motor housing 5 and housing 6 of the add-on unit are left at room temperature. As FIG. 4 shows, the shrink ring expands due to the resulting temperature difference of approximately 175° C. in such a way that the inner diameter of the tongues 12 roughly corresponds to the largest outer diameter of the areas 10 and 11 covered by the shrink ring. As a result, the two housings 5 and 6 can be slid into or pressed into the shrink ring 4 as depicted in FIG. 3. In order to simplify the joining process, the two tongues 12 of the shrink ring 4 are chamfered, in exactly the same way as the grooves 13 and 14. The components 4, 5 and 6 must then only be held in their position until the shrink ring 4 cools and has been shrunk on to the areas 10 and 11. This state is depicted in FIG. 5.

Figure 6:
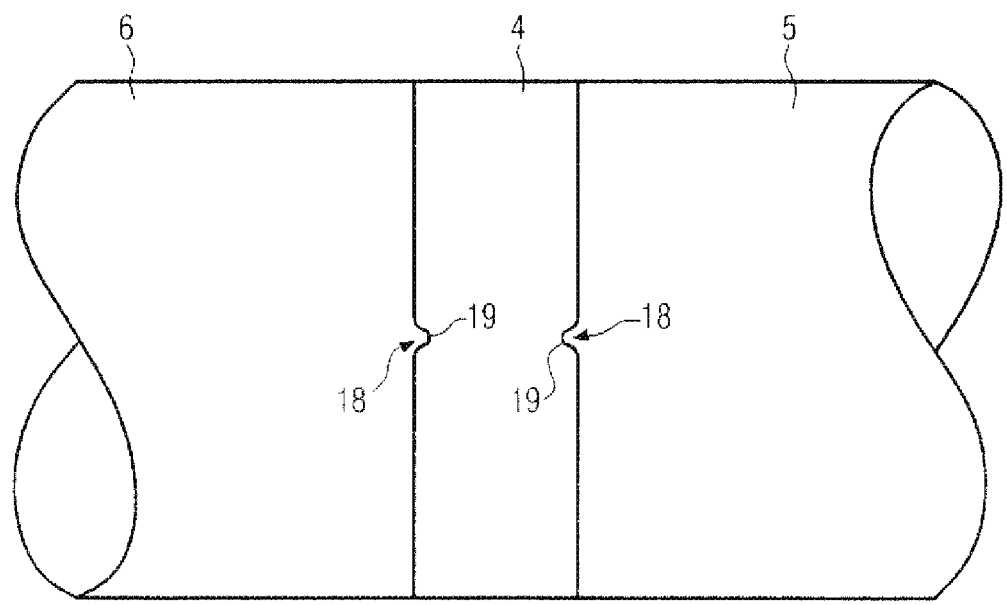
FIG. 6: a side-view of an electric motor with add-on unit according to the invention in a design with a positive locking in the circumferential direction.

FIG. 6 shows a side-view of an electric motor with add-on unit according to the invention according to FIGS. 1 and 2 with positive-locking elements for producing an additional positive locking in the circumferential direction. For this purpose, on each of its two face sides the shrink ring 4 has a notch 19 into which a corresponding lug 18 of the electric motor housing 5 or the housing 6 of the add-on unit engages in a positive locking. As a result, a twisting with respect to the electric motor and add-on unit is prevented. The positive-locking elements for producing a positive locking in the circumferential direction can also be provided on the inner side 9 of the shrink ring shown in FIG. 2 and on the corresponding opposite covered areas 10 and 11 of the two housings 5 and 6.

Figure 7:
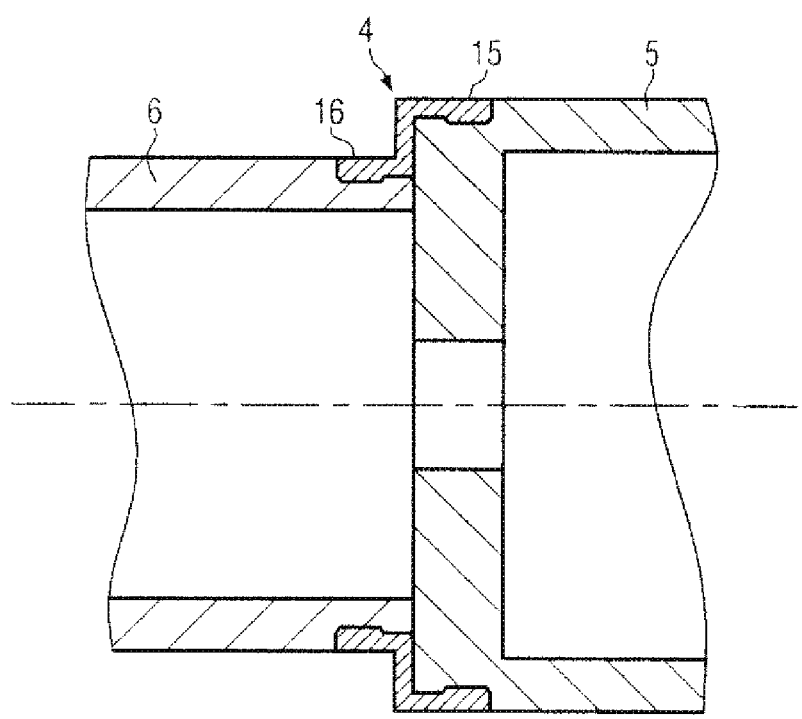
FIG. 7: a longitudinal section through a further electric motor with add-on unit according to the invention.

FIG. 7 shows a further embodiment of an electric motor with add-on unit according to the invention, whereby the housing 5 of the electric motor has an outer diameter that is greater than that of the housing 6 of the add-on unit. The connection by means of the shrink ring 4 essentially corresponds to the connection according to FIGS. 1 and 2, whereby the shrink ring has a first section 15 that is adapted to the outer diameter of the housing and furthermore a second section 16 that is adapted to the smaller outer diameter of the housing 6. A stepped transition exists between a first section 15 and second section 16, whereby, however, this transition can also be executed as a continual, for example, conical, expansion, particularly in the event of large differences between the outer diameters of the two housings 5 and 6.

The invention claimed is:

1. Electric motor with an add-on unit, comprising:
a housing of the electric motor firmly connected via a joint to a housing of the add-on unit at a connecting region;
a shrink ring thermally shrunk on to said housing of said electric motor and said housing of said add-on unit in the area of said connecting region so that said shrink ring covers said connecting region for exclusively forming said joint in a firm connection.

2. Electric motor according to claim 1, wherein the shrink ring is shrunk on to the electric motor and add-on unit in a frictional locking.

3. Electric motor according to claim 1, wherein the electric motor and add-on unit are trimmed circumferentially in a step-like manner in the area of the connecting region, wherein the shrink ring is held in step-like recesses.

4. Electric motor according to claim 1, wherein the inner side of the shrink ring and/or the areas of the electric motor and add-on unit covered by the shrink ring are roughened.

5. Electric motor according to claim 1, wherein the shrink ring and areas of the electric motor and add-on unit covered by the shrink ring have positive-locking elements, wherein the positive-locking elements of the shrink ring and the positive-locking elements of the covered areas engage in one another.

6. Electric motor according to claim 5, wherein the electric motor and add-on unit each has a circumferential groove into which a corresponding circumferential tongue of the shrink ring engages.

7. Electric motor according to claim 1, wherein the electric motor and add-on unit have different diameters, at least in the area of the connecting region, wherein the shrink ring has a first section adapted to a diameter of the electric motor and a second section adapted to a diameter of the add-on unit.

8. Electric motor according to claim 1, wherein the electric motor and add-on unit, at least in the area of the connecting region, are made of a material with a lower thermal expansion coefficient than a thermal expansion coefficient of material of the shrink ring.

9. Electric motor according to claim 8, wherein the electric motor and add-on unit are made of steel, at least in area of the connecting region, wherein the shrink ring is made of aluminium.

10. A method for connecting a housing of an electric motor and a housing of an add-on unit, comprising:
firmly connecting the housing of the electric motor and the housing of the add-on unit via a joint at a connecting region by thermally shrinking a shrink ring on to the housing of the electric motor and the housing of the add-on unit in an area of the connecting region so that the shrink ring covers the connecting region for exclusively forming the joint in a firm connection; and
creating a temperature difference between the shrink ring on the one hand and the housing of the electric motor as well as the housing of the add-on unit on the other hand, wherein a temperature of the shrink ring is greater than a temperature of the housing of the electric motor and housing of the add-on unit, and the housing of the electric motor and housing of the add-on unit are then firmly connected together and held so that the shrink ring shrinks on to the housing of the electric motor and the housing of the add-on unit.

11. A method according to claim 10, wherein an inner dimension of the shrink ring that is to be shrunk on is slightly less at room temperature than a respective outer dimension of the areas of the housing of the electric motor and housing of the add-on unit that are covered by the shrink ring, wherein the temperature difference is dimensioned in such a way that the difference between the outer dimension of the areas covered by the shrink ring and the inner dimension of the shrink ring after the temperature difference has been produced is reduced at least to the point that the shrink ring can be slid onto the electric motor and add-on unit.

12. A method according to claim 11, wherein the temperature difference lies in a range between 100° C. and 300° C.

13. A method according to claim 10, wherein the shrink ring is heated to achieve the temperature difference, wherein the electric motor and add-on unit remain at room temperature.

14. Method according to claim 10, wherein the shrink ring is heated by induction.

15. Electric motor according to claim 2, wherein the electric motor and add-on unit are trimmed circumferentially in a step-like manner in the area of the connecting region, wherein the shrink ring is held in step-like recesses.

16. Electric motor according to claim 15, wherein the inner side of the shrink ring and/or the areas of the electric motor and add-on unit covered by the shrink ring are roughened.

17. Electric motor comprising:
an add-on unit;
a housing of the electric motor firmly connected via a joint to a housing of the add-on unit at a connecting region;
a shrink ring which is thermally shrunk on to the electric motor and add-on unit in the area of the connecting region so that the shrink ring covers the connecting region and exclusively forms the joint for a firm connection,
wherein the shrink ring is shrunk on to the electric motor and add-on unit in a frictional locking means,
wherein the electric motor and add-on unit are trimmed circumferentially in a step-like manner in the area of the connecting region, wherein the shrink ring is held in step-like recesses,
wherein the inner side of the shrink ring and/or the areas of the electric motor and add-on unit covered by the shrink ring are roughened, and
wherein the shrink ring and areas of the electric motor and add-on unit covered by the shrink ring have positive-locking elements, wherein the positive-locking elements of the shrink ring and the positive-locking elements of the covered areas engage in one another.

18. Electric motor according to claim 17, wherein the electric motor and add-on unit have different diameters, at least in the area of the connecting region, wherein the shrink ring has a first section adapted to a diameter of the electric motor and a second section adapted to a diameter of the add-on unit.

19. Electric motor according to claim 18, wherein the electric motor and add-on unit, at least in the area of the connecting region, are made of a material with a lower thermal expansion coefficient than a thermal expansion coefficient of material of the shrink ring.

20. A method according to claim 11, wherein the temperature difference is 175° C.

\* \* \* \* \*